(12) United States Patent
Evanitsky

(10) Patent No.: US 10,176,369 B2
(45) Date of Patent: Jan. 8, 2019

(54) METHOD AND APPARATUS FOR GENERATING A SUMMARY DOCUMENT

(71) Applicant: Xerox Corporation, Norwalk, CT (US)

(72) Inventor: Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 149 days.

(21) Appl. No.: 15/360,409

(22) Filed: Nov. 23, 2016

(65) Prior Publication Data
US 2018/0144188 A1 May 24, 2018

(51) Int. Cl.
| G06F 17/00 | (2006.01) |
| G06K 9/00 | (2006.01) |
| G06F 17/27 | (2006.01) |
| G06K 9/18 | (2006.01) |
| G06F 17/28 | (2006.01) |
| G06Q 50/18 | (2012.01) |
| G06F 17/30 | (2006.01) |
| G06F 17/22 | (2006.01) |

(52) U.S. Cl.
CPC ..... *G06K 9/00469* (2013.01); *G06F 17/2735* (2013.01); *G06F 17/2745* (2013.01); *G06F 17/2775* (2013.01); *G06F 17/289* (2013.01); *G06F 17/30719* (2013.01); *G06K 9/18* (2013.01); *G06Q 50/18* (2013.01); *G06F 17/2235* (2013.01)

(58) Field of Classification Search
CPC .................................................. G06F 17/30719
See application file for complete search history.

(56) References Cited

U.S. PATENT DOCUMENTS

| 5,384,703 A * | 1/1995 | Withgott ........... G06F 17/30719 704/2 |
| 5,392,428 A * | 2/1995 | Robins .............. G06F 17/30722 |
| 5,842,221 A * | 11/1998 | Schmonsees ..... G06F 17/30289 |
| 5,907,841 A * | 5/1999 | Sumita .............. G06F 17/30011 |
| 6,601,026 B2 * | 7/2003 | Appelt .............. G06F 17/30616 704/9 |
| 6,928,425 B2 * | 8/2005 | Grefenstette ..... G06F 17/30011 707/754 |
| 8,190,637 B2 * | 5/2012 | Williamson ............ G06F 17/24 707/731 |
| 9,176,938 B1 * | 11/2015 | Kerschen ............ G06F 17/2235 |
| 9,430,470 B2 * | 8/2016 | Lord ................. G06F 17/30864 |
| 9,576,276 B2 * | 2/2017 | Stern .................... G06Q 10/107 |
| 2004/0102956 A1 * | 5/2004 | Levin .................. G06F 17/2735 704/2 |
| 2005/0210008 A1 * | 9/2005 | Tran .................. G06F 17/30864 |

(Continued)

*Primary Examiner* — Laurie A Ries

(57) ABSTRACT

An apparatus and a method for generating a summary document are disclosed. For example, the apparatus includes a document receiving device to receive an original document, a computer readable memory to store one or more topics that are predefined by a user and a translation dictionary, a document analysis device in communication with the document receiving device to analyze the original document based on the user to identify the one or more topics that are predefined by the user, and a summary document generator to generate the summary document that includes the one or more topics, a location of the one or more topics in the original document and a translation of the one or more topics obtained from the translation dictionary.

18 Claims, 5 Drawing Sheets

(56) References Cited

U.S. PATENT DOCUMENTS

| | | | | |
|---|---|---|---|---|
| 2009/0171726 A1* | 7/2009 | Johnson | ............... | G06Q 10/06 |
| | | | | 705/7.13 |
| 2010/0004938 A1* | 1/2010 | Sundstrom | ............... | 705/1.1 |
| 2010/0010968 A1* | 1/2010 | Redlich | ............... | G06F 17/30672 |
| | | | | 707/E17.014 |
| 2010/0278332 A1* | 11/2010 | Yamamoto | ............... | H04L 9/0625 |
| | | | | 380/28 |
| 2011/0184960 A1* | 7/2011 | Delpha | ............... | G06F 17/241 |
| | | | | 707/754 |
| 2012/0303357 A1* | 11/2012 | Yasin | ............... | G06F 17/30719 |
| | | | | 704/9 |
| 2013/0073400 A1* | 3/2013 | Heath | ............... | G06Q 30/02 |
| | | | | 705/14.73 |
| 2013/0157234 A1* | 6/2013 | Gulli | ............... | G09B 19/00 |
| | | | | 434/154 |
| 2013/0226844 A1* | 8/2013 | Zhang | ............... | G06N 5/04 |
| | | | | 706/12 |
| 2014/0244605 A1* | 8/2014 | Donis | ............... | G06F 17/30002 |
| | | | | 707/694 |
| 2015/0161090 A1* | 6/2015 | Bhagwat | ............... | G06F 17/27 |
| | | | | 715/249 |
| 2015/0169593 A1* | 6/2015 | Bogdanova | ............... | G06F 17/3071 |
| | | | | 707/738 |
| 2016/0098379 A1* | 4/2016 | Bufe | ............... | G06F 17/30616 |
| | | | | 715/245 |
| 2016/0342590 A1* | 11/2016 | Paulin | ............... | G06F 17/30011 |
| 2018/0067910 A1* | 3/2018 | Alonso | ............... | G06F 17/2211 |

* cited by examiner

METHOD AND APPARATUS FOR GENERATING A SUMMARY DOCUMENT

The present disclosure relates generally to document analysis and generation and, more particularly, to a method and apparatus for generating a summary document.

BACKGROUND

Some products or software packages often come with contracts or end user license agreements (EULA). Often, users will agree to the terms of the contract or the EULA without fully understanding what the user is committing to or agreeing to. The user may agree to the terms since the contract or EULA may be a large document with language that is difficult to understand. It may take too much time for the user to read the entire document. The user may have the attitude of "what can I do about it anyway?" and just rely on the reputation of the company that produced the contract or EULA.

SUMMARY

According to aspects illustrated herein, there are provided an apparatus and a method for generating a summary document. One disclosed feature of the embodiments is an apparatus that comprises a document receiving device to receive an original document, a computer readable memory to store one or more topics that are predefined by a user and a translation dictionary, a document analysis device in communication with the document receiving device to analyze the original document based on the user to identify the one or more topics that are predefined by the user, and a summary document generator to generate the summary document that includes the one or more topics, a location of the one or more topics in the original document and a translation of the one or more topics obtained from the translation dictionary.

Another disclosed feature of the embodiments is a method for generating a summary document. In one embodiment, the method comprises receiving, by a processor, an original document, analyzing, by the processor, the original document to identify a plurality of topics, identifying, by the processor, one or more topics that are predefined by a user based on a comparison of the one or more topics stored in a database to the plurality of topics that are identified in the original document, obtaining, by the processor, a translation of the one or more topics that are predefined by the user that are identified in the original document from a translation dictionary stored in the database and generating, by the processor, the summary document that includes the one or more topics, a location of the one or more topics in the original document and the translation of the one or more topics obtained from the translation dictionary.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for generating a summary document. As discussed above, some products or software packages often come with contracts or end user license agreements (EULA). Often, users will agree to the terms of the contract or the EULA without fully understanding what the user is committing to or agreeing to. The user may agree to the terms since the contract or EULA may be a large document with language that is difficult to understand. It may take too much time for the user to read the entire document. The user may have the attitude of "what can I do about it anyway?" and just rely on the reputation of the company that produced contract or EULA.

Embodiments of the present disclosure provide a novel apparatus and method that can analyze the contract or EULA to look for topics that are of interest to a user and providing the topics in a clear and concise summary document so that the user may easily understand what the contract or EULA is stating. The summary document may include information regarding the topic of interest, a location of the topic, a translation of the topic into simple and easy to understand language and a hyper link to the original document stored in a database or computer readable memory. In addition, if the contract or EULA does not comply with a user's preferences for the topics of interest, the apparatus of the present disclosure may optionally include alternative recommendations for products or services that have a contract or a EULA that comply with the user's preferences for the topics of interest.

Figure 1:
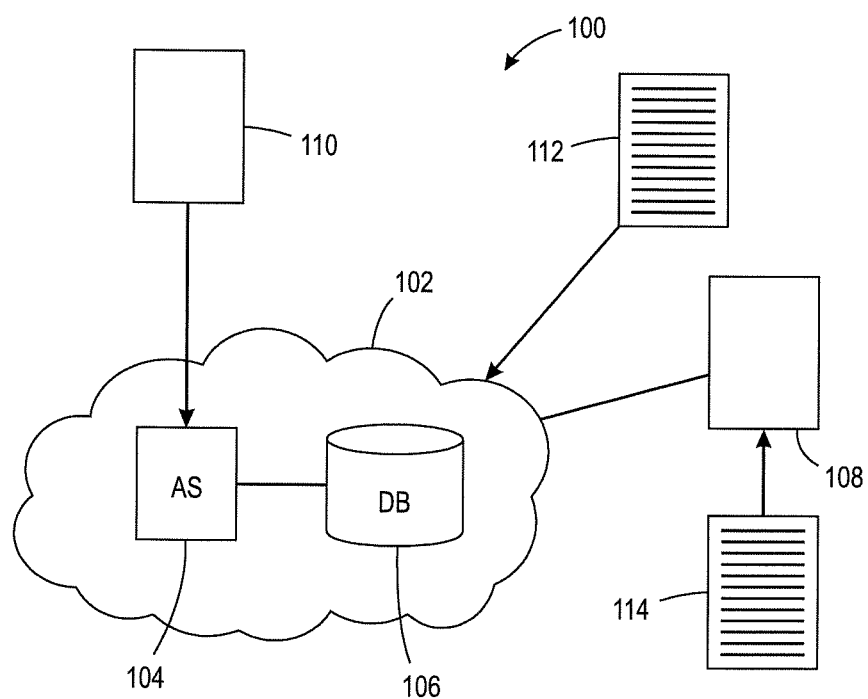
FIG. 1 illustrates an example communication network of the present disclosure.

FIG. 1 illustrates an example communications network 100 of the present disclosure. In one embodiment, the communications network 100 may include an Internet Protocol (IP) network 102. The IP network 102 may include a dedicated application server (AS) 104 and a database (DB) 106. The AS 104 and the DB 106 may be deployed as separate hardware devices or as a single hardware device. In one embodiment, the AS 104 and the DB 106 may be operated and controlled by a service provider that provides a service to generate a summary document 114, as discussed below. Although only a single AS 104 and a single DB 106 are illustrated in FIG. 1, it should be noted that any number of application servers and databases may be deployed. In addition, it should be noted that the IP network 102 may include additional network elements or access networks not shown (e.g., border elements, gateways, network controllers, routers, switches, wireless access networks, cellular access networks, and the like).

In one example, the communications network 100 may include an endpoint device 108. Although a single endpoint device 108 is illustrated in FIG. 1, it should be noted that any number of endpoint devices 108 associated with one or more different users may be deployed. The endpoint device 108 may be a user endpoint device that is located remotely from the AS 104 and the DB 106. The endpoint device 108 may be any type of endpoint device such as, for example, a desktop computer, a laptop computer, a tablet computer, a smartphone, and the like. The endpoint device 108 may establish a wired or wireless communication path with the AS 104.

In one embodiment, the endpoint device 108 may have an original document 112. The original document 112 may be scanned by the endpoint device 108, photographed by the endpoint device 108 or an electronic file stored at the endpoint device 108. The original document 112 may be an end user license agreement, contract, or other type of document that may be difficult to understand. For example, the original document 112 may be supplied by a company, a product manufacturer, or a service provider of a software program, service or product that the user must agree to before using the software program, service or product. Typically, the user may not read the original document 112 and blindly agrees to the terms of the original document 112.

One embodiment of the present disclosure provides the dedicated AS 104 that can analyze the original document 112 for the user and identify any topics that are of concern to the user. In one embodiment, the original document 112 may be sent to the AS 104 as an electronic file over the communication path. The AS 104 may analyze the original document 112 to identify one or more topics that are predefined by the user of the endpoint device 108. Any type of optical character reader or word learning engines may be used to read the original document 112 and compare the words and phrases to the predefined topics of interest.

For example, the DB 106 may store topics of interest that are predefined by the user. The topics of interest may be specific areas associated with agreements, end user licenses or contracts that are important to the user. The topics may include privacy concerns, sharing contact information, unsolicited offers, access to configuration settings on the user's endpoint device 108, whether the user will lose rights to other similar products, hidden fees, whether the terms can change without notice, changes after introductory pricing, and the like.

In one embodiment, the user may set up a user profile that includes the one or more topics that are predefined by the user. The user profile may be stored in the DB 106 and can be periodically updated by the user via the endpoint device 108.

In one embodiment, the DB 106 may include a translation dictionary. For example, the original document 112 may include legalese or other archaic language that is difficult to understand. The translation dictionary may provide definitions or re-wording of the language used in the original document 112 into easy to understand language. For example, some contractual terms may be translated, legalese phrases may be re-worded, and the like.

In another embodiment, the translation dictionary may also provide a translation of different spoken languages. For example, the legalese in the original document 112 may be translated from English into easy to understand language that is in Spanish, French, Chinese, or any other spoken languages of choice. In other words, the original document 112 may be in English. However, the user may be more comfortable reading in Spanish. As a result, the translation dictionary can help perform two functions. The first function would be to re-word the legalese into easy to understand language, and the second function would be to translate the easy to understand language from English into Spanish.

The AS 104 may generate a summary document 114 based on the analysis of the original document and the one or more topics that are predefined by the user. In one embodiment, the summary document 114 may include the one or more topics that match the one or more topics that are predefined by the user, a location (e.g., a page number, line number, paragraph number, and the like) of the one or more topics in the original document 112, a translation of the one or more topics obtained from a translation dictionary and a hyperlink to the original document stored in the computer readable memory of the DB 106.

In one embodiment, the summary document 114 may be transmitted electronically back to the endpoint device 108 via the communication path. The summary document 114 may be displayed to the user via the endpoint device 108 in a new window. The user may be provided options to print a physical copy of the summary document 114 on paper, store the summary document 114 locally on the endpoint device 108, store the summary document 114 in the DB 106 under the user's account and preferences, and the like.

In one embodiment, the summary document 114 may also optionally include suggestions for similar products or services based on the preferences of the one or more topics that are predefined for a user. For example, if the original document 112 does not match a user's preferences for the identified topics, the AS 104 may automatically include a list of similar products or services that do match a user's preference for the identified topics.

To illustrate, the user may care about topics of user privacy and configuration settings on a computer. The user preference may be that no information is shared for the user privacy topic and that the software program will not change any settings on the computer for the configuration settings topic. The original document 112 for software program A may indicate that user information is shared. As a result, the summary document 114 may optionally include suggestions for software program B that does not share user information and does not change any settings on the computer.

In one embodiment, the AS 104 may analyze original documents from other companies and service providers to identify the topics included in the original documents. The results of the analysis may be stored in the DB 106 and compared to the topics that are predefined by the user to determine the alternative products or services that are similar to the product or service associated with the original document 112.

In one embodiment, the AS 104 may periodically access a server 110 of the company, the product manufacturer, or the service provider to determine if the original document 112 has been updated. For example, the company may periodically update the terms of the original document 112 without notifying the user of the endpoint device 108. Although only a single server 110 is illustrated in FIG. 1, it should be noted that any number of servers 110 may be deployed in the communications network 100.

Thus, the AS 104 may establish a communication path to the server 110 and obtain a current copy of the original document on the server 110. The current copy of the original document may be compared to the original document 112 that was received from the endpoint device 108. If any changes are detected in the current copy of the original document, a notification message may be generated and transmitted to the endpoint device 108 to notify the user. In one embodiment, the notification message may include the location and topics that have changed so the user may easily identify the changes without having to read the entire current copy of the original document. In one embodiment, the notification message may only be generated if a topic that is predefined by the user has changed. For example, if a topic that is not of interest to the user has changed in the current copy of the original document, then no notification message may need to be generated and transmitted.

In one embodiment, the summary document generation services may be provided at different levels of service. For example, a first level may be a free service that can be used in real-time. The user may choose from a selection of different types of original documents 112 and have the document analyzed. A second level may be a paid subscription service that provides custom topic results, personalized learning of user preferences for topics, storage of past results, notifications on updates, suggestions for similar products, and the like. A third level may be a higher fee subscription service that provides the user access to online consultation with a legal advisor. Although three different service levels are described, it should be noted that any number of different service levels may be deployed.

Figure 2:
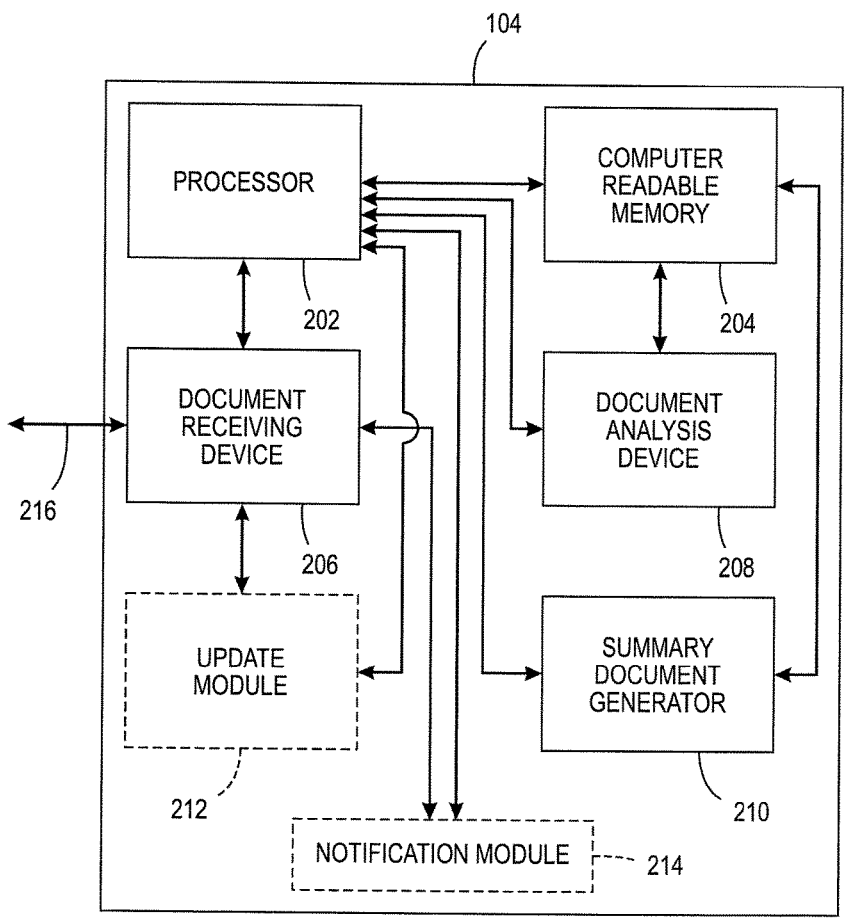
FIG. 2 illustrates a detailed block diagram of an example apparatus of the present disclosure.

FIG. 2 illustrates a detailed block diagram of an apparatus or the dedicated AS 104 of the present disclosure. The dedicated AS 104 may be customized hardware to perform the methods and functions described herein.

In one embodiment, the AS 104 may include a processor 202, a computer readable memory 204, a document receive device 206, a document analysis device 208 and a summary document generator 210. In addition, the AS 104 may include an optional update module 212 and an optional notification module 214.

In one embodiment, the processor 202 may execute instructions stored in the computer readable memory 204. In one embodiment, the computer readable memory 204 may also store the original document 112 that is received from the endpoint device 108 and the summary document 114 that is generated. The computer readable memory 204 may also store the one or more topics that are predefined by a user, the translation dictionary, a user profile, and the like. However, it should be noted that the one or more topics that are predefined by the user, the translation dictionary, the user profile, and the like may optionally also be stored on the DB 106.

In one embodiment, the document receiving device 206 may comprise a communication device. For example, the document receiving device 206 may be a wired or wireless network adapter or network card that can be used to establish a communication path 216. The communication path 216 may be established to and from the endpoint device 108 or to and from the server 110 to transmit and receive data, electronic files (e.g., the original document 112 or the summary document 114), transmit notification messages, and the like.

In one embodiment, the document analysis device 208 may include hardware such as an optical character reader, or scanner, and software to read the characters that are read by the optical character reader or scanner. The characters may be identified into words or phrases. The document analysis device 208 may then use language learning programs to identify topics that are in the original document 112. The document analysis device 208 may then compare the identified topics to the one or more topics that are predefined by the user and stored in the computer readable memory 204. The document analysis device 208 may identify topics that are of interest to the user based on the comparison.

Figure 3:
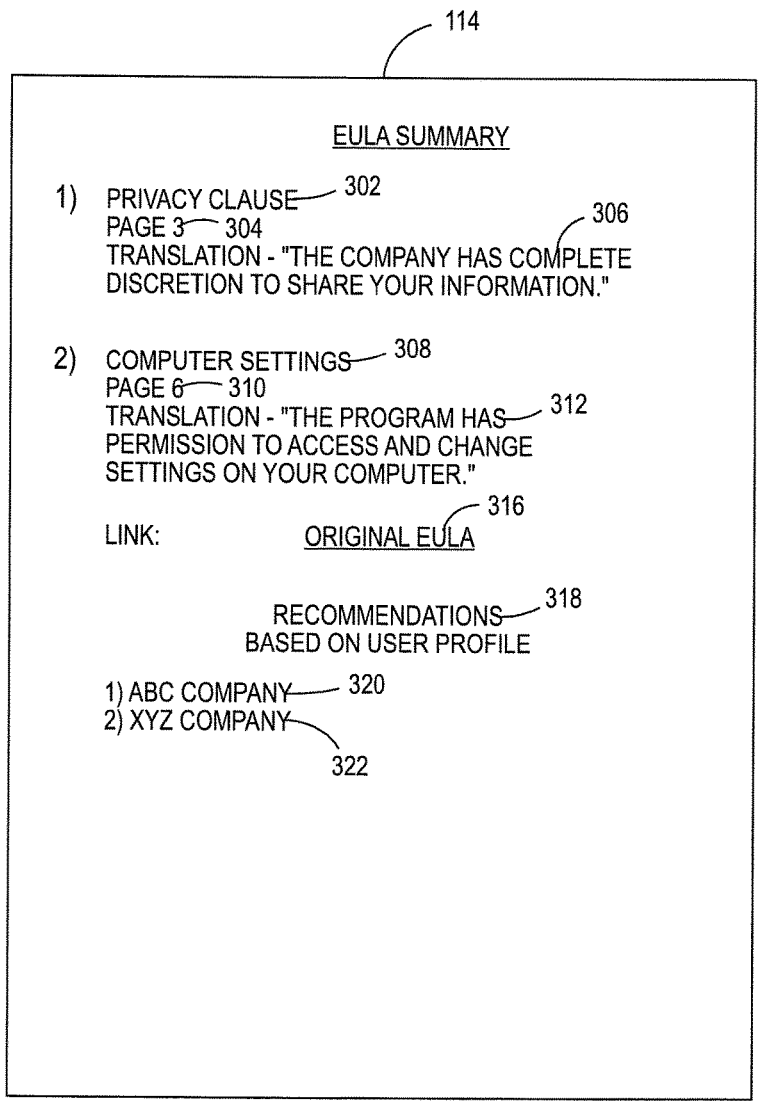
FIG. 3 illustrates an example of a summary document generated by the apparatus of the present disclosure.

In one embodiment, the summary document generator 210 may generate the summary document 114 based on the analysis performed by the document analysis device 208. FIG. 3 illustrates an example of the summary document 114 that is generated by the summary document generator 210.

In one example, the summary document 114 may include one or more topics 302 and 308 identified in the original document 112 that match the one or more topics predefined by the user. The summary document 114 may include a respective location 304 or 310 for each respective topic 302 or 308. In one embodiment, the locations 304 and 310 may be a page number, a line number, a paragraph number, a range of page numbers, line numbers or paragraph numbers, and the like, of where the topic is located in the original document 112.

The summary document 114 may also include a respective translation 306 or 312 of the language used in the original document 112 for each respective topic 302 or 308. For the original document 112 may be an end user license agreement that includes numerous paragraphs regarding examples of personal information, pictures, documents and the like that can be shared, or used, by the company that produces the product associated with the end user license agreement. The translation 306 may convert the pages of language regarding the topic 302 of privacy into a concise summary that "the company has complete discretion to share your information."

In one embodiment, the summary document 114 may also include a hyperlink 316 to the original document 112. For example, when the user opens the electronic file of the summary document 114 on the endpoint device 108, the hyperlink 316 may be linked to an address in the computer readable memory 204 of the DB 106 where the original document 112 is stored. The hyperlink 316 may connect the endpoint device 108 to the location where the original document 112 is stored to allow the endpoint device 108 to access the original document 112. For example, the user may want to view the exact language associated with the topics 302 and 308 that are identified in the original document 112.

In one embodiment, the summary document 114 may also optionally include recommendations 318. The recommendations 318 may include a list of similar products, companies, service providers or product manufacturers 320 and 322 that produce a similar product or provide a similar service as the product or service associated with the original document 112. The recommendations 318 may be based on original documents associated with the products of similar companies or service providers that have language in the topics that match a user's preferences.

For example, the original document 112 may have language associated with a topic of computer settings that indicates setting can be accessed and changed by the computer program product associated with the original document 112. However, the user may prefer computer program products that do not access settings on the endpoint device 108. Thus, the summary document generator 210 may find original documents stored in the computer readable memory 204 from other companies that include language that the computer program product will not access settings on the endpoint device 108. The computer program products from the other companies 320 and 322 may be included in the optional recommendations 318.

It should be noted that although the summary document 114 includes two topics 302 and 308 and two companies 320 and 322 in the recommendations 318 that any number of topics and companies may be included. It should be noted that although the summary document 114 illustrates a particular order or arrangement in FIG. 3, that the topics 302 and 308, the hyperlink 316 and the recommendations 318 may be arranged in any order or location within the summary document 114.

It should also be noted what is not included in the summary document 114. For example, the summary document 114 may not include anything other than the topics 302 and 308 that are of interest to the user. For example, boiler plate language or other text that is not of interest to the user may be deleted to provide a shorter and more manageable summary document 114 to the user.

In one embodiment, portions of the summary document 114 may be stored in the DB 106 and recycled for other users to improve the speed at which the summary document 114 may be generated. For example, many different users may review the same original document 112 that is associated with a popular software program or service. Some of the different users may have common topics of interest. As a result, when a translation 306 of a topic 302 that is of interest to a first user is performed, the translation 306 may be stored. Then when a second user is also interested in the topic 302, the translation 306 may be inserted into the summary document 114 from the DB 106 rather than requiring the summary document generator 210 to perform a translation again.

In another embodiment, the summary document 114 may also optionally include comments from other users. For example, the original document 112 may be shared on social media websites and other users may comment on portions of the original document. The location of the comments may be stored and included as part of the translation 306 in the summary document 114. For example, the topic 302 may include comments from other users from the social media websites. As a result, when the summary document generator 210 performs the translation 306 on the original document 112 for the topic 302, the summary document generator 210 may see that comments are saved in the DB 106 for the topic 302. Thus, the comments may be included with the translation 306.

In one embodiment, only objective comments may be included. In one embodiment, objective comments may be distinguished from subjective comments using a natural language processor or any other word analysis program.

In one embodiment, the summary document generator 210 may also generate an annotated version of the original document 112. For example, the user may want to modify the original document 112 before agreeing to the terms of the original document 112. For example, the user may be at a rental car counter and receive a large rental contract. The user may scan the rental contract with the endpoint device 108 and transmit the rental contract to the AS 104 for analysis. The rental contract may be analyzed and a summary document 114 may be sent to the user summarizing the topics of interest to the user. In addition, an annotated version of the original document 112 may be sent to the user with changes to the language of some of the topics of interest to the user that the user does not agree with based on the stored user profile.

For example, the user may care about any clause regarding legal fees and that the user does not want any language that requires the user to pay all legal fees. The rental contract may contain a clause requiring the user to pay all legal fees and the summary document generator 210 may modify the language to state that each party will pay their own respective legal fees. The annotated version of the original document 112 may be signed and executed by the user and provided to the rental car counter for execution. Notably, all of the processing may occur relatively quickly as the user is at the rental car counter.

Referring back to FIG. 2, the optional update module 212 may access the server 110 via the communication path 216 established by the document receiving device 206. The update module 212 may obtain a current original document in the server 110 and compare the current original document to the original document 112 received from the endpoint device 108. The comparison may determine if there are any differences between the current original document obtained from the server 110 and the original document 112 received from the endpoint device 108.

If any differences are detected, the optional notification module 214 may generate a notification message. The notification message may be transmitted to the endpoint device 108 via the communication path 216 established by the document receiving device 206. In one embodiment, the notification message may be generated and transmitted only if the differences are related to topics that match the one or more topics predefined by the user. For example, if the changes are to a topic that does not match the one or more topics predefined by the user, then the user may not care about changes related to that topic and may not want to be notified of any updates.

In one embodiment, the notification message may be an email, a pop-up notification, a text message, and the like, that is electronically sent to the endpoint device 108. In one embodiment, the notification message may include the topics that have changed and a location within the current original document that the language of the topics have changed from the original document 112. In one embodiment, the notification message may include a hyperlink to an electronic copy of the current original document that is stored in the computer readable memory 204 of the AS 104 or the DB 106. As a result, the user may access the electronic copy of the current original document via the endpoint device 108 when clicking on the hyperlink.

Figure 4:
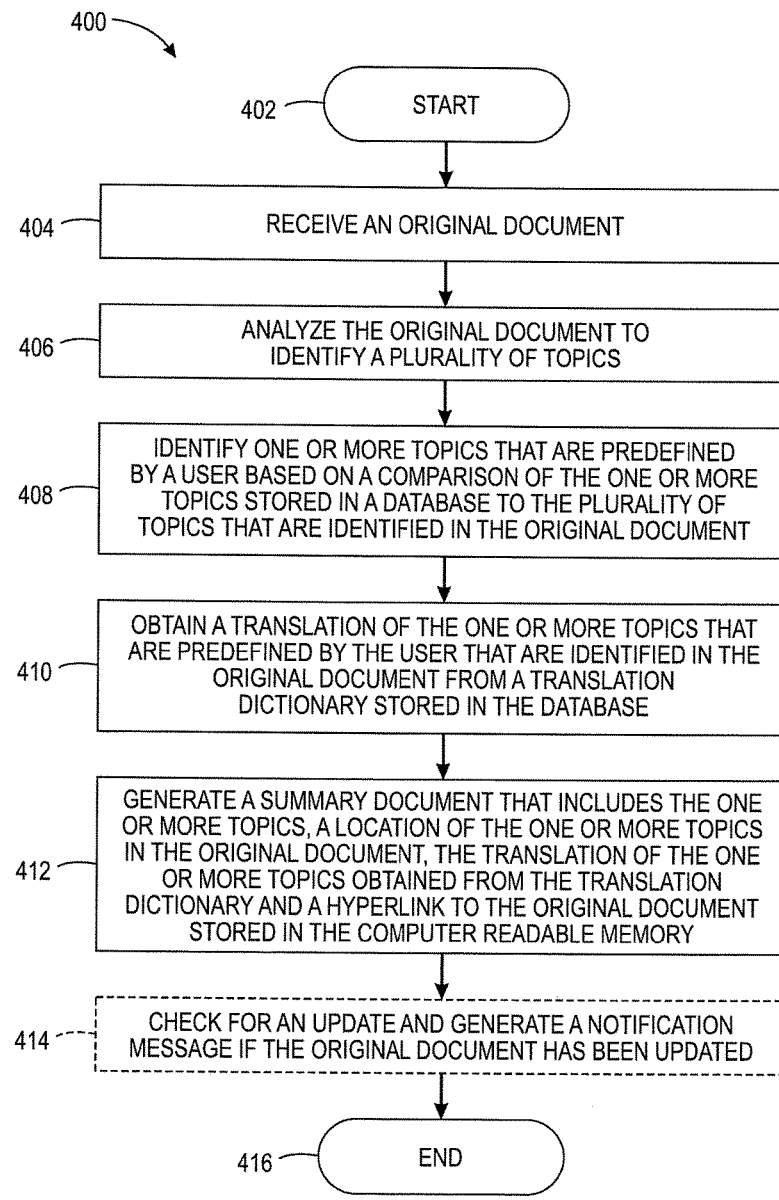
FIG. 4 illustrates a flowchart of an example method for generating a summary document.
Figure 5:
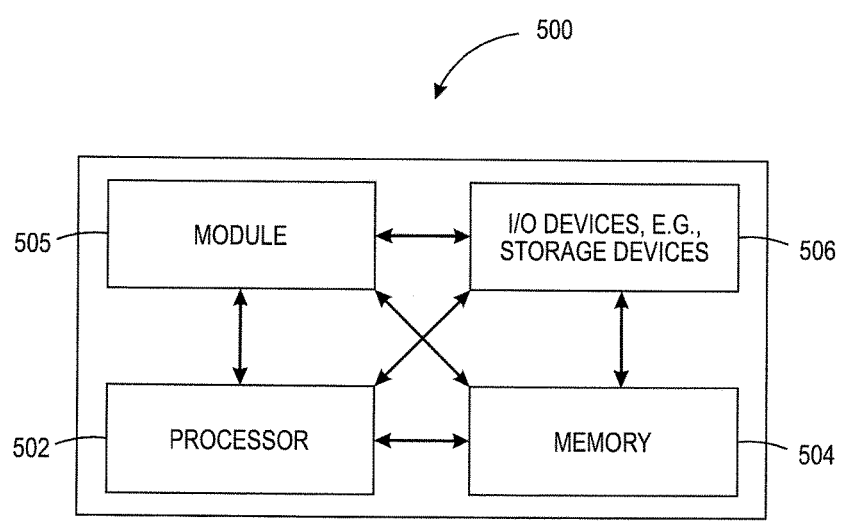
FIG. 5 illustrates a high-level block diagram of a computer suitable for use in performing the functions described herein.

FIG. 4 illustrates a flowchart of an example method 400 for generating a summary document. In one embodiment, one or more steps or operations of the method 400 may be performed by the dedicated application server 104 illustrated in FIG. 1 or a computer as illustrated in FIG. 5 and discussed below.

At block 402, the method 400 begins. At block 404, the method 400 receives an original document. In one embodiment, the original document may be a contract, an end user license agreement (EULA), or any other legal document associated with a product or service. The original document may be presented to the user when the service is provided or when the product is deployed (e.g., upon an initial user of a software program). The original document may be an electronic file that is transmitted from an endpoint device of a user. The original document may be a scanned and saved as an electronic file or may be an electronic document that is part of a software program.

At block 406, the method 400 analyzes the original document to identify a plurality of topics. In one embodiment, the original document may be analyzed by an optical character reader and a natural language processor to identify the plurality of topics. The topics may be legal topics associated with the original document. For example, the original document may be written in a form that includes a pattern of text such as a heading for each topic and the parameters of each topic below the heading. The optical character reader and the natural language processor may identify the topics such as privacy concerns, sharing contact information, unsolicited offers, access to configuration settings on the user's endpoint device 108, whether the user will lose rights to other similar products, hidden fees, whether the terms can change without notice, changes after introductory pricing, and the like.

At block 408, the method 400 identifies one or more topics that are predefined by a user based on a comparison of the one or more topics stored in a database to the plurality of topics that are identified in the original document. In one embodiment, the user may have a user profile that includes topics that are of interest to the user. For example, the user may predefine topics such as privacy or computer settings as topics the user cares about.

The user may also indicate what parameters are acceptable for the predefined topics. For example, the user may specify that with respect to the topic of privacy that any original document that gives a company complete control over all pictures and personal information may be unacceptable. The user may specify that he or she prefers the terms to state that the company must receive permission before using any pictures or sharing personal information.

At block 410, the method 400 obtains a translation of the one or more topics that are predefined by the user that are identified in the original document from a translation dictionary stored in the database. For example, the original document may be a legal document. Many legal documents may use archaic language that is difficult to understand. As a result, the topics of interest to the user that are identified in the original document may be translated into an easier to understand language.

At block 412, the method 400 generates a summary document that includes the one or more topics, a location of the one or more topics in the original document, the translation of the one or more topics obtained from the translation dictionary and a hyperlink to the original document stored in the computer readable memory. The summary document may optionally include recommendations for products or services similar to the product or service associated with the original document. The recommendations may be based on topics and parameters included in a respective original document of the similar product or service that is acceptable to the user.

At optional block 414, the method 400 may check for an update and generate a notification message if the original document has been updated. For example, the user may want to be notified when the terms of the original document change over time. For example, if a privacy topic changes to allow the company to have complete control of all files stored from use of a computer program then the user may want to stop using the computer program. As a result, the method 400 may periodically obtain a current version of the original document from a server of the company or service provider and compare the current version of the original document to the original document received from the endpoint device of the user. If any changes are detected, the changes and the location of the changes may be noted in the notification message. The notification message may then be transmitted to the endpoint device of the user. The method 400 ends at block 416.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for generating a summary document, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for generating a summary document (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for generating a summary document (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for generating a summary document, comprising:
   a document receiving device to receive an original document;
   a computer readable memory to store one or more topics that are predefined by a user and a translation dictionary;
   a document analysis device in communication with the document receiving device to analyze the original document to identify the one or more topics that are predefined by the user; and
   a summary document generator to generate the summary document that includes the one or more topics, a location of the one or more topics in the original document, a translation of the one or more topics obtained from the translation dictionary and a hyperlink to the original document stored in the computer readable memory, wherein the summary document generator generates a recommendation comprising a list of alternative products based on a product associated with the original document and the one or more topics that are predefined by the user.

2. The apparatus of claim 1, wherein the document receiving device comprises:
   a communication module to establish a communication path with an endpoint device of the user and receive the original document via the communication path.

3. The apparatus of claim 1, wherein the document analysis device comprises:
   an optical character reader to read characters on the original document; and
   a processor to identify words from the characters that are read on the original document and compare the words that are identified to the one or more topics that are predefined by the user that are stored in the computer readable memory.

4. The apparatus of claim 1, wherein the summary document comprises a hard copy printed by the summary document generator or an electronic copy created by the summary document generator.

5. The apparatus of claim 1, further comprising:
   an update module to access a server of a company that generated the original document to check for updates to the original document; and
   a notification module to generate a notification message that the original document has been updated.

6. A method for generating a summary document, comprising:
   receiving, by a processor, an original document, wherein the original document comprises a contract or an end user license agreement;
   analyzing, by the processor, the original document to identify a plurality of topics;
   identifying, by the processor, one or more topics that are predefined by a user based on a comparison of the one or more topics stored in a database to the plurality of topics that are identified in the original document;
   obtaining, by the processor, a translation of the one or more topics that are predefined by the user that are identified in the original document from a translation dictionary stored in the database; and
   generating, by the processor, the summary document that includes the one or more topics, a location of the one or more topics in the original document, the translation of the one or more topics obtained from the translation dictionary and a hyperlink to the original document stored in a computer readable memory.

7. The method of claim 6, wherein the original document is received via a communication path established with an endpoint device of the user.

8. The method of claim 7, further comprising:
   transmitting, by the processor, the summary document to the endpoint device of the user via the communication path.

9. The method of claim 6, further comprising:
   establishing, by the processor, a communication path to a server of a company that generated the original document to check for updates to the original document;
   determining, by the processor, that the original document has been updated; and
   generating, by the processor, a notification message that the original document has been updated.

10. The method of claim 9, wherein the notification message is transmitted to an endpoint device of the user.

11. The method of claim 9, wherein the notification message comprises language that was modified in the original document and a location where the language was modified in the original document.

12. The method of claim 6, further comprising:
   recommending, by the processor, a list of alternative products based on a product associated with the original document and the one or more topics that are predefined by the user.

13. The method of claim 6, further comprising:
   determining, by the processor, a level of service of the user; and
   providing, by the processor, one or more additional options to the user based on the level of service of the user.

14. The method of claim 13, wherein the level of service of the user comprises a free service level or a paid service level.

15. The method of claim 14, wherein the level of service comprises the free service level and the one or more additional options comprise receiving the summary document.

16. The method of claim 14, wherein the level of service comprises the paid service level and the one or more additional options comprise at least one of: customizing topic areas, storing past summary documents that were generated, a personalized notification of updates to the original document or online access to an advisory.

17. A method for generating a summary document, comprising:
   receiving, by a processor, an electronic copy of an end user license agreement (EULA);
   analyzing, by the processor, the EULA to identify each legal topic contained in the EULA;
   identifying, by the processor, one or more legal topics that are predefined by a user based on a comparison of the one or more legal topics stored in a database to the each legal topic contained in the EULA;
   obtaining, by the processor, a translation of the one or more legal topics that are predefined by the user that are contained in the EULA from a legal translation dictionary stored in the database; and generating, by the processor, the summary document that includes the one or more legal topics, a page number associated with each one of the one or more legal topics contained in the EULA, the translation of the one or more legal topics obtained from the legal translation dictionary and a hyperlink to the EULA stored in a computer readable memory.

18. The method of claim 17, further comprising:

establishing periodically, by the processor, a communication path to a server of a company that generated the EULA to check for updates to the EULA;

determining, by the processor, that the EULA has been changed; and generating, by the processor, a notification message that the EULA has been changed and a summary of each change that has been made to the EULA.

* * * * *